United States Patent [19]

Noguera

[11] 3,973,811

[45] Aug. 10, 1976

[54] BALL BEARING ROLLERS FOR RING SPINNING MACHINES

[76] Inventor: John Michael Noguera, 1 Greville House, Kinnerton St., London SW.1, England

[22] Filed: Jan. 8, 1975

[21] Appl. No.: 539,432

[30] Foreign Application Priority Data
Jan. 14, 1974 United Kingdom................ 1700/74

[52] U.S. Cl. ......................... 308/189 R; 308/187.1; 308/201; 308/228
[51] Int. Cl.² ........................................ F16C 13/00
[58] Field of Search .............. 308/189 R, 139, 158, 308/162, 190, 201, 228, 232, 187.1

[56] References Cited
UNITED STATES PATENTS
2,588,459    3/1952   Annen........................ 308/189 R
2,635,300    4/1953   Butler ......................... 308/189 R
3,397,019    8/1968   Day et al. .......................308/201
3,649,094    3/1972   Russell............................. 308/201

*Primary Examiner*—M. H. Wood, Jr.
*Assistant Examiner*—Richard A. Bertsch
*Attorney, Agent, or Firm*—Haseltine, Lake & Waters

[57]        ABSTRACT

Ball bearing roller unit for a ring spinning machine comprising a pair of hollow rollers mounted on a common spindle with a pair of bearings within each roller including caged bearing elements, each partially contained in an inner track formed in the spindle and in an outer track formed in the inner surface of the roller.

6 Claims, 1 Drawing Figure

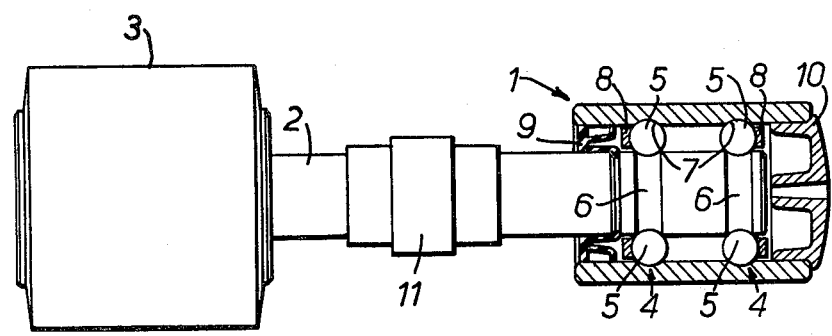

BALL BEARING ROLLERS FOR RING SPINNING MACHINES

This invention relates to ball bearing rollers for ring spinning machines.

It is well known to provide, for ring spinning machines, pairs of rollers, each pair being ball-bearing mounted on a common spindle, one roller at or towards one end of the spindle and the other roller at or towards the other end of the spindle. Midway along its length the spindle has an enlarged center piece for locating the assembled unit in a ring spinning machine and the like.

Alternatively the assembled unit may be located in a ring spinning machine with the ends of the spindle extending through the rollers and supported beyond the rollers. To accommodate the ball bearings the rollers are hollow and each is closed at its inner end by a ring seal that is located on a corresponding shoulder of the spindle; and at its outer end by a seal in the form of a cap that is placed in position after the roller has been mounted on the spindle, or by a ring seal if the spindle passes through the outer end of the roller.

Each roller runs on a pair of bearings spaced-apart axially of the roller. The balls of these bearings run in grooved races formed in the spindle, the outer running surfaces for the balls, constituted by the inner surfaces of the rollers, being plain so that with the balls positioned in their races in the spindle (retained in position by bearing cages), the rollers can be slipped over the balls to assemble the unit.

However, although this arrangement is necessary so that the unit can be assembled, a serious disadvantage arises from the use of plain outer running surfaces. This is that the load that can be carried by such a bearing is less than is the case with a bearing having grooved inner and outer races, since if a too heavy load is applied to the roller the balls wear a groove in the outer running surface, whereupon the roller runs eccentrically which is not acceptable.

Accordingly, it is extremely desirable that the balls of each bearing should run in inner and outer races that are both in the form of tracks partially containing the balls, but the problem is to provide such a form of bearing in a unit that can be assembled simply and is inexpensive to manufacture.

According to the present invention there is provided a ball bearing roller unit for a ring spinning machine and the like, comprising a pair of hollow rollers mounted, spaced from one another, on a common spindle; first seals serving to close the inner ends of the hollow rollers, the spindle being formed to permit displaceing these first seals along the spindle from positions between the rollers and clear thereof to their roller-closing positions; a pair of bearings within each roller spaced apart axially of the roller and each including caged bearing elements each partially contained in an inner track formed in the spindle and in an outer track formed in the inner surface of the roller; and second seals serving to close the outer ends of the roller. Each cage has pockets one for each bearing element that are all open to one common side of the bearing.

This construction permits assembly of the unit to be effected by mounting the first seals on the spindle to be between and clear of the rollers when in their running positions and mounting on the spindle any of the cages that cannot be subsequently mounted thereon, placing the bearing elements for each roller, uncaged, in the tracks therefor in the roller and entering the spindle into each roller with the uncaged bearing elements disposed in a bunch to permit the spindle to enter the roller eccentrically, engaging cages for the bearings of each roller with the bearing elements of these bearings, displacing the first seals along the spindle to their roller-closing positions, and placing the second seals on the outer ends of the rollers in their roller-closing positions.

The spindle may be grooved at appropriate positions to receive the first seals, and if necessary also the second seals, in their roller-closing positions and thereby retain the seals in these positions. Apart from such grooves, the tracks, and a center piece midway along its length for locating the unit in a ring spinning machine, the spindle is preferably of constant diameter throughout and is accordingly simple to manufacture.

A further feature of the invention is that if the unit is one in which the rollers are very close together in their running positions, the center piece just mentioned is omitted during manufacture of the spindle so that there is sufficient room to displace the first seals during assembly of the unit. After assembly, with the first seals disposed in their roller-closing positions, the center piece, e.g. of plastics material, is moulded onto the spindle.

For a better understanding of the invention and to show how the same may be carried into effect, reference will now be made, by way of example, to the accompanying drawing, in which the single FIGURE shows, partly in side view and partly in section, a roller unit for a ring spinning machine.

The roller unit of the FIGURE has a pair of rollers 1 mounted on a common spindle 2 at the opposite ends of the spindle. A cover 3 provided on each roller has been omitted from the right-hand roller in the FIGURE, which roller is shown in section.

Each roller runs on a pair of bearings 4 spaced-apart axially of the roller, balls 5 of these bearings running in inner tracks 6 formed in the spindle 2 in outer tracks 7 formed in the inner surface of the roller. Each ball 5 is partially contained in each of the tracks 6, 7 in which it runs. The balls 5 of each bearing are maintained spaced apart from one another around their tracks by a bearing cage 8, each cage having pockets, one for each ball, that are all open to one common side of the bearing. The interior of each roller is closed by a seal 9 at its inner end and a cap 10 at its outer end serving as a second seal.

In the particular form being described the pockets of each cage are all open in the direction towards the other bearing of the pair of bearings, and are defined by flexible walls that can flex to permit entry of the balls into the pockets and thereafter act to retain the balls in the pockets.

Alternatively, the cage pockets could all be open in the opposite direction. In a further alternative, the pockets have rigid walls and the balls are held in position by the seal 9 and cap 10.

Midway along its length the spindle 1 has a center piece 11 for locating the unit in a ring spinning machine.

The unit in the particular form described is assembled as follows. First the two seals 9 are slid onto the spindle 1 and moved up close to the center piece 11 so as to be well clear of the rollers when in their running positions. Next, with the rollers disposed with their axes horizontal, the balls of the bearings are placed, without their cages, in their tracks 7 in the rollers so that they form a bunch around the lower portion of each track 7. The spindle 11 with the cages for the inner bearing balls placed thereon can then be entered, eccentrically of the rollers, into each roller.

The cages for the inner bearing balls are moved along the spindle into the rollers, the cages for the outer bearing balls are entered into the rollers through their outer ends, and each of the cages 8 is maneuvred onto the balls it is to cage so that the balls enter their individual pockets in the cage and are retained therein. The seals 9 are slipped along the spindle 11 and into the inner ends of the rollers, and the caps 10 are placed in position to close the outer ends of the rollers.

If desired the spindle can be grooved to receive and retain the seals 9 in the roller-closing positions.

As mentioned previously, if the unit is one in which the rollers 1 are very close together, the center piece 11 is omitted during manufacture of the spindle, so that there is sufficient room to displace the seals during assembly of the unit, and a plastics center piece is moulded onto the spindle 1 after the rollers have been mounted on the spindle.

Where cages having the pockets open in the opposite direction mentioned above are utilised, all the cages are placed on the spindle before it is entered in the rollers, and the cages are maneuvred onto the balls, utilising a suitable tool.

If the unit is of a kind, not shown, in which the spindle projects through the outer ends of the rollers, the caps are replaced by second seals similar to the first seals described above, and the spindle is grooved, if necessary, to receive and retain these second seals in their roller-closing positions.

I claim:

1. A ball bearing roller unit for a ring spinning machine and the like, comprising a pair of hollow rollers mounted, spaced from one another, on a common spindle; first seals serving to close the inner ends of said rollers, said spindle being formed to permit displacing said first seals along said spindle from positions between said rollers and clear thereof to roller-closing positions; a pair of bearings within each of said rollers, spaced apart axially of the latter, and each including bearing elements with cages; said elements being partially contained in an inner track formed in said spindle and in an outer track formed in the inner surface of said rollers; and second seals serving to close the outer ends of said rollers; said cages having pockets, one for each of said bearing elements, that are all open to one common side of said bearings; wherein said spindle is of a constant diameter save for said tracks; that is said spindle has at no point along its length a diameter greater than that in the vicinity of said bearings.

2. The ball bearing roller unit as defined in claim 1, wherein said spindle is grooved to receive at least one of said seals in their respective roller-closing positions and thereby retain said seals in position, and has an enlarged center piece along its length for locating the unit in the machine.

3. The ball bearing roller unit as defined in claim 1, wherein said spindle has an enlarged center piece for locating the unit in the machine, said center piece being moulded onto said spindle after assembly of said bearings.

4. The ball bearing roller unit as defined in claim 1, wherein said pockets of the cages are all open, for each of said pairs of bearings, in a selected axial direction with respect to the other one of said bearings of the respective pairs.

5. The ball bearing roller unit as defined in claim 1, wherein said pockets of each cage are defined by flexible walls that can flex to permit entry to bearing balls into said pockets and thereafter act to retain said balls therein.

6. The ball bearing roller unit as defined in claim 1, wherein said pockets of each cage have rigid walls, and bearing balls held in position by said seals.

* * * * *